(12) United States Patent
Chi et al.

(10) Patent No.: US 9,917,610 B2
(45) Date of Patent: Mar. 13, 2018

(54) MOBILE APPLICATION INTERACTION GUIDE VIA TACTILE FEEDBACK

(71) Applicant: International Business Machines Corporation, Armonk, NY (US)

(72) Inventors: Jian Wen Chi, Shanghai (CN); Yu Wei Sun, Shanghai (CN); Li Yue, Shanghai (CN); Kang Zhang, Shanghai (CN); Liyi Zhou, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/943,062

(22) Filed: Nov. 17, 2015

(65) Prior Publication Data
US 2016/0378188 A1 Dec. 29, 2016

Related U.S. Application Data

(63) Continuation of application No. 14/749,704, filed on Jun. 25, 2015.

(51) Int. Cl.
*H04B 1/3827* (2015.01)
*G06F 3/0488* (2013.01)

(52) U.S. Cl.
CPC ....... *H04B 1/3827* (2013.01); *G06F 3/04883* (2013.01)

(58) Field of Classification Search
CPC .......... G06F 3/041; G06F 3/016; G06F 3/048; G06F 3/0481; G06F 3/0483; G06F 3/01; H04B 1/3827
See application file for complete search history.

(56) References Cited

U.S. PATENT DOCUMENTS

| | | | |
|---|---|---|---|
| 8,712,383 B1 | 4/2014 | Hayes et al. | |
| 8,730,181 B1* | 5/2014 | Raman | G06F 3/04886 178/18.01 |
| 8,830,191 B2 | 9/2014 | Papakipos et al. | |
| 2003/0234768 A1* | 12/2003 | Rekimoto | G06F 3/0488 345/169 |

(Continued)

OTHER PUBLICATIONS

Baudisch et al., "Back-of-Device Interaction Allows Creating Very Small Touch Devices", CHI 2009~New Mobile Interactions, Apr. 9, 2009~Boston, MA, USA, pp. 1923-1932.

(Continued)

*Primary Examiner* — Kumar Patel
*Assistant Examiner* — Amy C Onyekaba
(74) *Attorney, Agent, or Firm* — L. Jeffrey Kelly

(57) ABSTRACT

A method includes detecting, by a contact sensing layer, a position of one or more fingers of a mobile device user, the contact sensing layer is located in a back area of a mobile device and the one or more fingers of the mobile device user are in direct contact with the contact sensing layer, receiving the detected position of the one or more fingers, identifying a plurality of advanced features contained in at least one software application running on the mobile device, selecting a feedback type based on the plurality of advanced features, and sending the selected feedback type to an interactive layer of the mobile device causing the interactive layer to generate a notification which is detectable by the one or more fingers, the notification communicates at least one of the advanced features to the mobile device user.

10 Claims, 6 Drawing Sheets

(56) References Cited

U.S. PATENT DOCUMENTS

| | | | |
|---|---|---|---|
| 2010/0277430 A1* | 11/2010 | Cruz-Hernandez | G06F 3/016 345/173 |
| 2011/0163860 A1* | 7/2011 | Ryu | G06F 3/016 340/407.2 |
| 2011/0163946 A1* | 7/2011 | Tartz | G06F 3/016 345/156 |
| 2011/0261058 A1* | 10/2011 | Luo | G06F 1/1626 345/441 |
| 2012/0115445 A1* | 5/2012 | Tartz | G06F 3/016 455/414.1 |
| 2013/0100035 A1 | 4/2013 | Papakipos et al. | |
| 2013/0100036 A1 | 4/2013 | Papakipos et al. | |
| 2014/0028562 A1 | 1/2014 | St. Clair | |
| 2014/0267136 A1* | 9/2014 | Phipps | G06F 3/03547 345/174 |
| 2014/0333568 A1 | 11/2014 | Papakipos et al. | |
| 2015/0123775 A1 | 5/2015 | Kerdemelidis | |
| 2015/0293695 A1* | 10/2015 | Schonleben | G06F 3/04886 345/173 |
| 2015/0302709 A1 | 10/2015 | Fadell et al. | |
| 2016/0091971 A1* | 3/2016 | Burr | G06F 1/1643 715/702 |

OTHER PUBLICATIONS

Wobbrock et al., "The performance of hand postures in front- and back-of-device interaction for mobile computing", ScienceDirect, International Journal of Human-Computer Studies, vol. 66, 2008, pp. 857-875.

Pending U.S. Appl. No. 14/749,704, filed Jun. 25, 2015, entitled: "Mobile Application Interaction Guide Via Tactile Feedback", 22 pages.

IBM: List of IBM Patents or Patent Applications Treated As Related (Appendix P), Dated Feb. 13, 2017, 2 pages.

* cited by examiner

MOBILE APPLICATION INTERACTION GUIDE VIA TACTILE FEEDBACK

BACKGROUND

The present invention generally relates to user-interface interaction using touch layers, and more particularly to sending a user a physical notification via a touch layer on a back area of a mobile device.

Touch-sensitive user interfaces, such as touch screens and touch pads, have become more and more prevalent among electronic device manufactures. Particularly, in mobile devices, touch-sensitive user interfaces may facilitate the device operation to the user. By implementing touch-sensitive user interfaces, direct access and interaction with menu functions may be provided to the user by simply touching or tapping them, thus reducing the need for on-screen indicators and hardware input devices.

SUMMARY

According to one embodiment of the present disclosure a method may include detecting, by a contact sensing layer, a position of one or more fingers of a mobile device user, the contact sensing layer is located in a back area of a mobile device and the one or more fingers of the mobile device user are in direct contact with the contact sensing layer, receiving the detected position of the one or more fingers, identifying a plurality of advanced features contained in at least one software application running on the mobile device, selecting a feedback type based on the plurality of advanced features, and sending the selected feedback type to an interactive layer of the mobile device causing the interactive layer to generate a notification which is detectable by the one or more fingers, the notification communicates at least one of the advanced features to the mobile device user.

According to another embodiment of the present disclosure a computer system may include one or more processors, one or more computer-readable memories, one or more computer-readable tangible storage devices, and program instructions stored on at least one of the one or more storage devices for execution by at least one of the one or more processors via at least one of the one or more memories, the computer system is capable of performing a method including: detecting, by a contact sensing layer, a position of one or more fingers of a mobile device user, the contact sensing layer is located in a back area of a mobile device and the one or more fingers of the mobile device user are in direct contact with the contact sensing layer, receiving the detected position of the one or more fingers, identifying a plurality of advanced features contained in at least one software application running on the mobile device, selecting a feedback type based on the plurality of advanced features, and sending the selected feedback type to an interactive layer of the mobile device causing the interactive layer to generate a notification which is detectable by the one or more fingers, the notification communicates at least one of the advanced features to the mobile device user.

According to another embodiment of the present disclosure, a computer program product may include a computer readable non-transitory article of manufacture tangibly embodying computer readable instructions which, when executed, cause a computer to carry out a method including: detecting, by a contact sensing layer, a position of one or more fingers of a mobile device user, the contact sensing layer is located in a back area of a mobile device and the one or more fingers of the mobile device user are in direct contact with the contact sensing layer, receiving the detected position of the one or more fingers, identifying a plurality of advanced features contained in at least one software application running on the mobile device, selecting a feedback type based on the plurality of advanced features, and sending the selected feedback type to an interactive layer of the mobile device causing the interactive layer to generate a notification which is detectable by the one or more fingers, the notification communicates at least one of the advanced features to the mobile device user.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention generally relates to user-interface interaction using touch layers, and more particularly to sending a user a physical notification via a touch layer on a back area of a mobile device.

The simplicity of the user-interface design in current mobile devices may complicate, in certain applications, the display of more advanced features to the user. Also, supplementary information or instructions about a particular application (e.g. games) may be contained within subdirectories which location may be difficult to map or may be displayed in areas of the device screen that may interfere with the user experience.

By using a touch or contact sensing layer on the back of a mobile device, embodiments of the present disclosure may, among other potential benefits, allow direct and immediate notification to the user of advanced features or hidden instructions available within a particular application via physical vibration and/or temperature change.

Figure 1A:
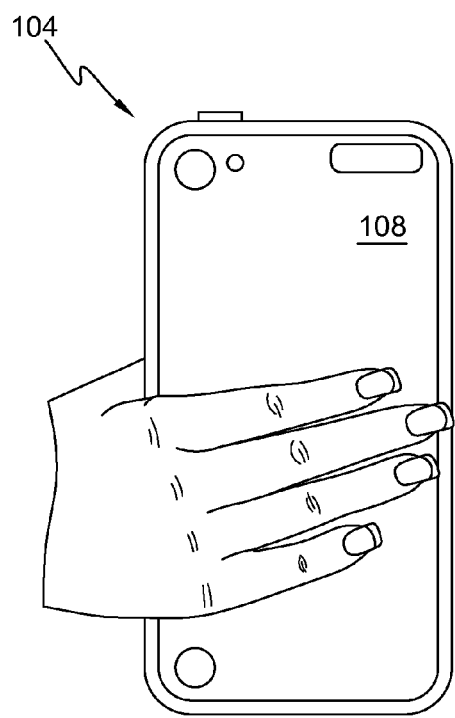
FIGS. 1A-1B illustrate different views of a mobile device, according to an embodiment of the present disclosure.
Figure 1B:
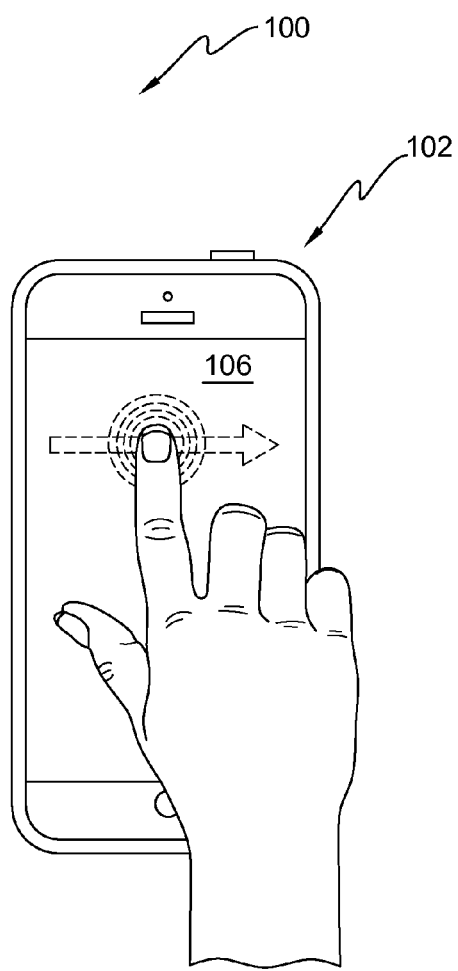

Referring now to FIGS. 1A-1B, front and back views of a mobile device 100 are shown, according to an embodiment of the present disclosure. In one embodiment, the mobile device 100 may be, for example, a smartphone device. The mobile device 100 may include a front area 102 and a back area 104.

The front area 102 of the mobile device 100 may include a touchscreen interface 106 which may allow a display of images and touchscreen operations by user interaction with the touchscreen interface 106. The user interaction may be with reference to displayed elements, such as buttons or selectable components, or may be general gestures for issuing commands or navigating the display.

The back area 104 of the mobile device 100 may include an outer layer 108 (hereinafter "contact sensing layer") which may be capable of detecting the position of the user's fingers. The contact sensing layer 108 may allow direct interaction with the device user as will be described in detail below.

Figure 2:
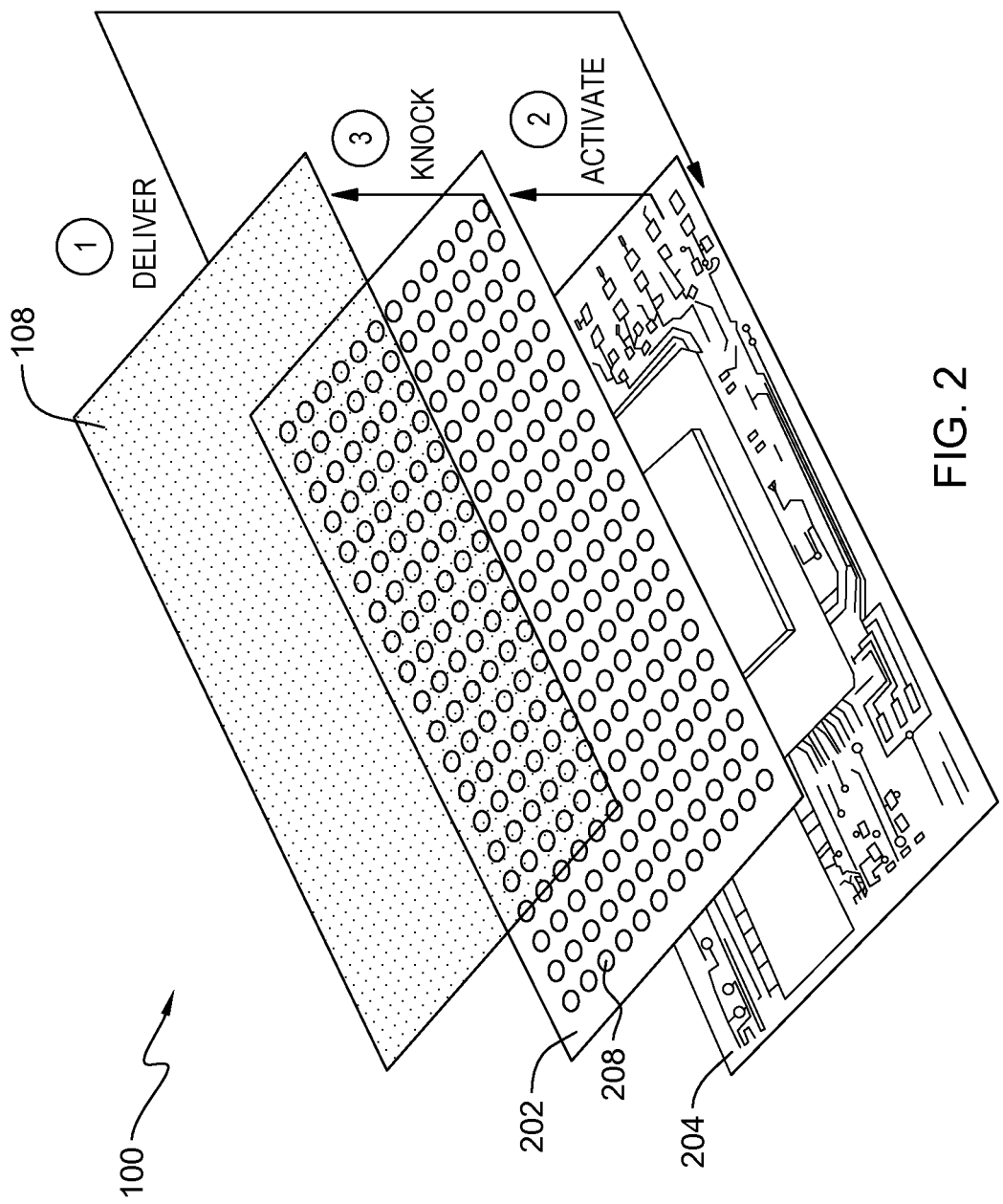
FIG. 2 is a diagram illustrating an exemplary mobile device architecture, according to an embodiment of the present disclosure.

Referring now to FIG. 2, a diagram illustrating an exemplary architecture of the mobile device 100 is shown, according to an embodiment of the present disclosure. In this embodiment, the contact sensing layer 108 may be above and in direct contact with an interactive layer 202 which may communicate with a chip 204 of the mobile device 100 and the contact sensing layer 108. It should be noted that the interactive layer 202 and the contact sensing layer 108 may already exist in current mobile devices and the way they interact with the chip 204 may be known to those skilled in the art.

The contact sensing layer 108 and the interactive layer 202 may provide a haptic system interacting with the chip 204 to generate a tactile feedback to the device user in the form of a directional physical vibration flow. In one embodiment, the contact sensing layer 108 may be capable of detecting the position of the user's fingers which may be received by the chip 204 where a response may then be selected and sent to the interactive layer 202 to generate the actual vibration response to the user.

To create the vibration flow, the interactive layer 202 may include a plurality of balls 208 disposed in an array or grid including equidistant parallel rows over a surface of the interactive layer 202 as illustrated. Each row of the plurality of balls 208 may be configured to generate a motion wave that may travel in different directions according to the detected finger position in the contact sensing layer 108. According to the detected location of the user's fingers (Step 1 Deliver), a response may be activated in the chip 204 (Step 2 Activate) and communicated to the interactive layer 202 such that a sensation of sequential knocks or taps hopping from one point to other points (Step 3 Knock) may be generated to present a notification to the user.

The interactive layer 202 may take advantage of current haptic technologies to generate a kinesthetic notification to the user in different directions. The different types of vibration flow to notify the user may include, for example, vertical, horizontal, or angled movements relative to the mobile device 100. Vertical movements may include down to up and up to down. Horizontal movements may include left to right and right to left. Angled movements may include any direction other than vertical or horizontal.

Figure 3:
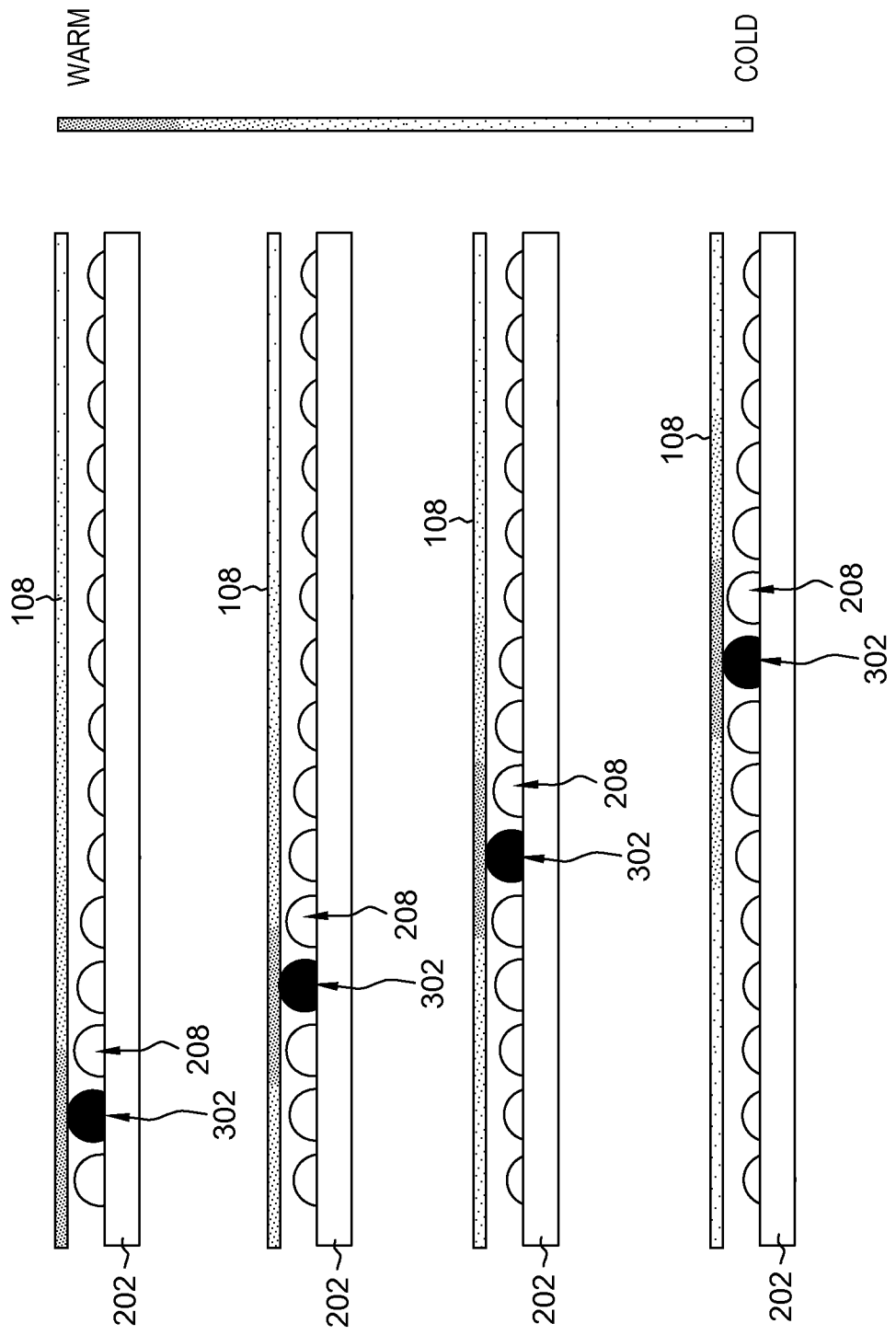
FIG. 3 is a diagram illustrating the functioning of an interactive layer, according to an embodiment of the present disclosure.

In some embodiments, the interactive layer 202 may also be capable of locally elevating a temperature of the contact sensing layer 108 such that heat may be conducted from the interactive layer 202 through the contact sensing layer 108 to the user's fingers. In some embodiments, as shown in FIG. 3, the elevated temperature may compliment the tactile feedback of the vibration flow. In an alternative embodiment, the vibration flow and the elevated temperature may function independently and be designed to communicate two different types of feedback either by the same application or different applications. The temperature change and/or the vibration flow may indicate the user to perform an action or response/acknowledgement of an action just performed.

Depending on the capabilities of the mobile device 100 and/or the desired function of the application, the physical notification may include a directional vibration, a temperature change or both.

Referring now to FIG. 3, a cross-sectional view describing the interaction between the interactive layer 202 and the contact sensing layer 108 is shown, according to an embodiment of the present disclosure. In this embodiment, each of the plurality of balls 208 in the interactive layer 202 may move relative to the detected position of the user's fingers in the contact sensing layer 108. In the area of the contact sensing layer 108 in which a finger is positioned, at least one ball of the plurality of balls 208 may hop (indicated by arrow 302) creating the sensation of sequential taps identifiable by the user's fingers. This action may be accompanied with a localized change in the contact sensing layer 108 temperature, depending on the capabilities of the mobile device 100 as described above.

Referring now to FIGS. 4A-4F, a top view of the interactive layer 202 is shown at different stages during generation of a physical response via a heat transfer mechanism, according to an embodiment of the present disclosure. In this embodiment, the mobile device 100 is capable of changing the temperature of the contact sensing layer 108 (FIG. 3) to provide a physical notification. The contact sensing layer 108 (FIG. 3) may be embedded with the electric heating elements arranged in a grid or array similar to the vibration response above. Based on the position of the user's fingers, a plurality of heating nodes 402 (hereinafter "heating nodes") may be heated in an orderly fashion through at least one heating line 404 to provide a detectable notification to the user. More specifically, the interactive layer 202 may use the heating nodes 402 to generate a temperature wave that travels in different directions according to the detected position of the one or more fingers by the contact sensing layer 108 (FIG. 3).

Figure 4:
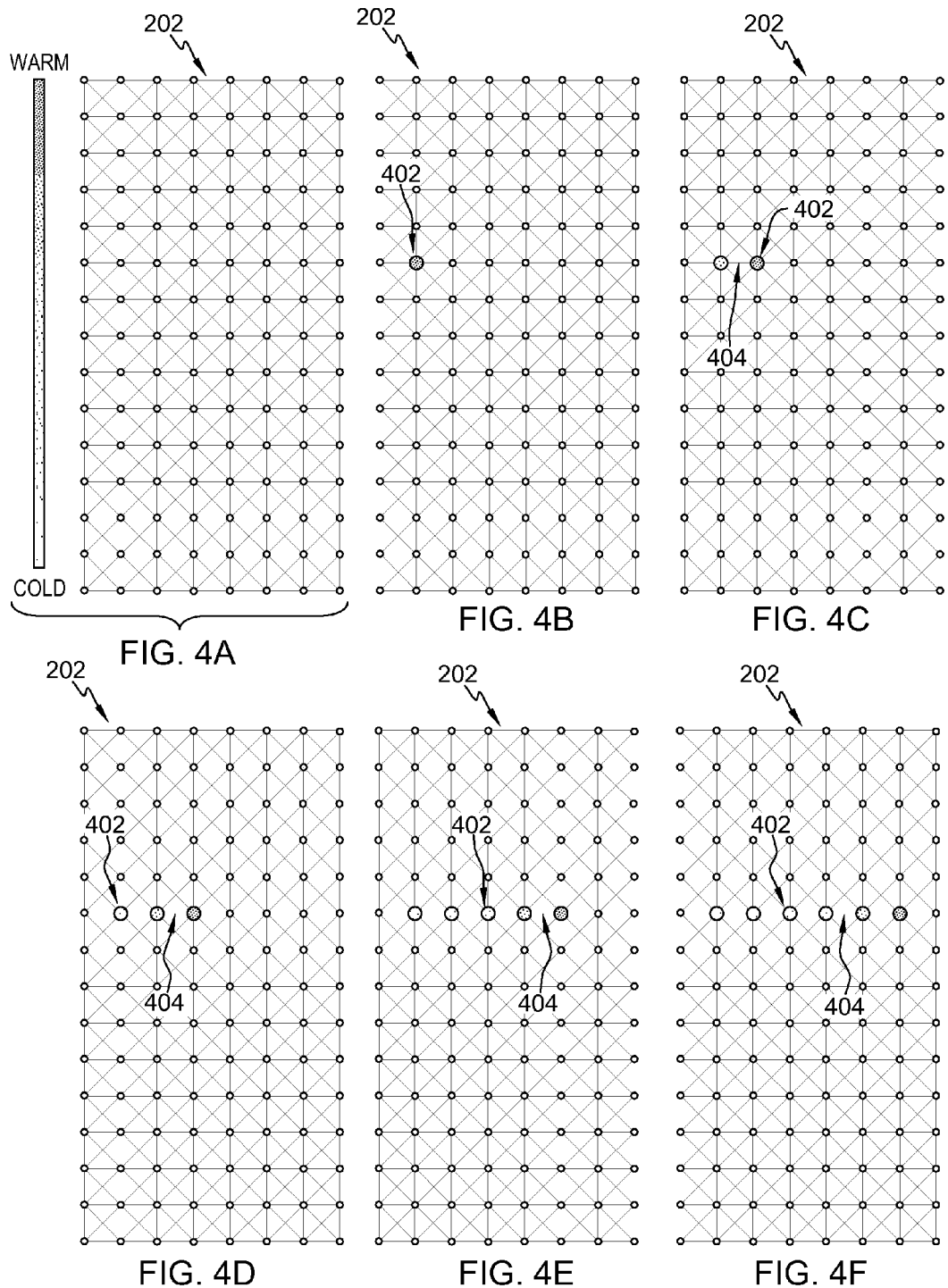
FIGS. 4A-4F illustrate a heat transfer mechanism in the interactive layer, according to an embodiment of the present disclosure.
Figure 5:
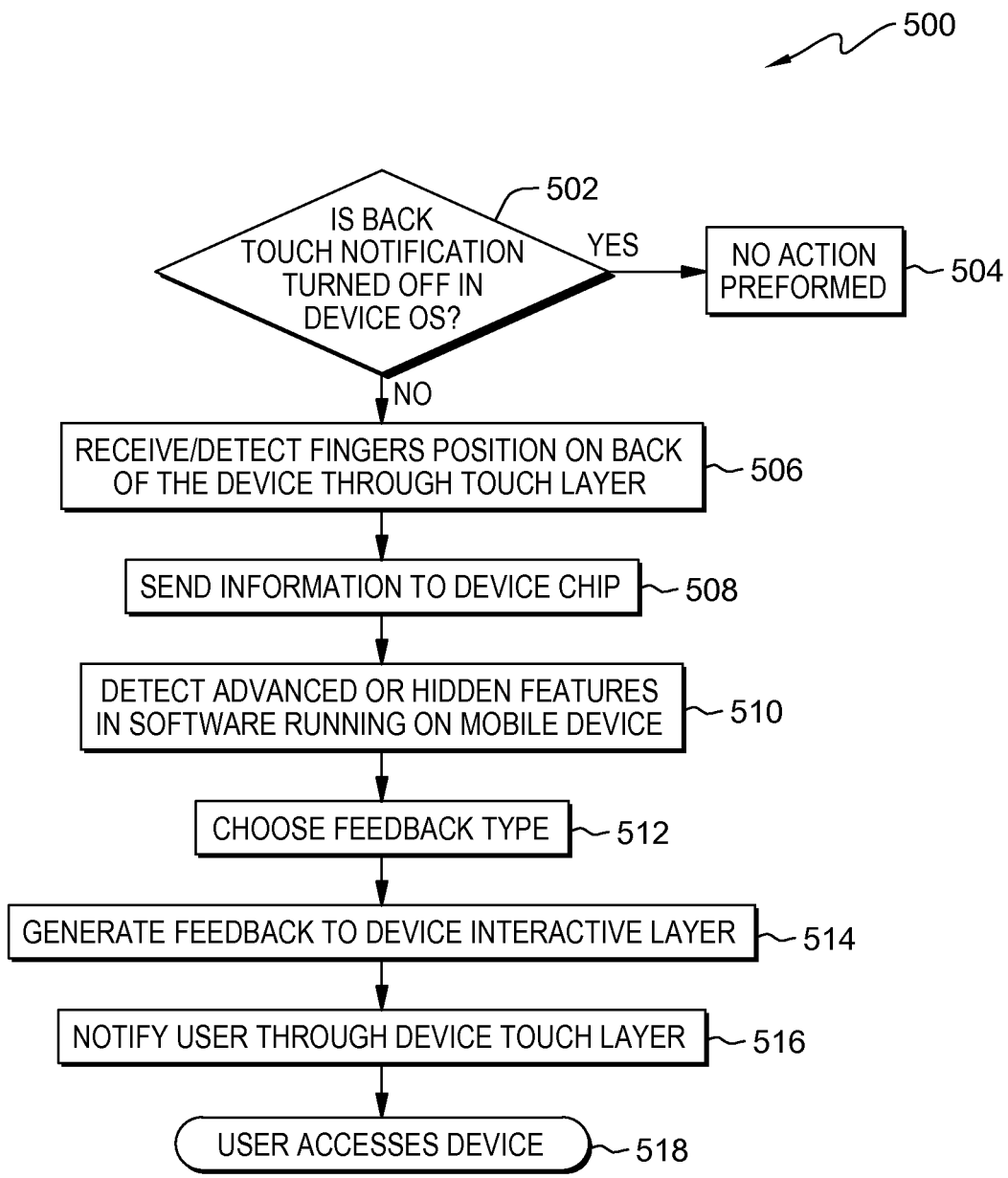
FIG. 5 is a flowchart illustrating the steps carried by a physical notification application, according to an embodiment of the present disclosure.

Alternatively, the heating nodes may be heated in any recognizable pattern in order to provide or communicate a notification to the user. As may be observed in FIGS. 4B-4F, according to the direction in which the temperature change may occur, one heating node 402 may be heated (FIG. 4B). Subsequently, an adjacent heating node 402 (FIG. 4C) may also be heated, the process may repeat until the temperature of each heating node 402 located within the same heating line 404 has been increased creating a heat wave in the contact sensing layer 108 as illustrated in FIGS. 4D-4F. It should be noted that owing to space limitations a temperature bar indicating temperature variations from warm to cold is shown associated to FIG. 4A only, however temperature variations in each of the heating nodes 402 located within the heating line 404 depicted in FIGS. 4B through 4F can be interpreted using the temperature bar shown in FIG. 4A. The different lines of heating nodes 402 may generate a directional temperature change (or heat wave) in a surface of the contact sensing layer 108 (FIG. 3) that may indicate the user to perform an action or a response/acknowledgement. In an exemplary embodiment, the temperature change may occur in different directions including, for example, from top to bottom, from left to right, or any combination thereof.

Referring now to FIGS. 5 and 6A-6D, a flowchart 500 illustrating the steps carried by a physical notification application and an exemplary implementation are respectively shown, according to an embodiment of the present disclosure.

Figure 6D:
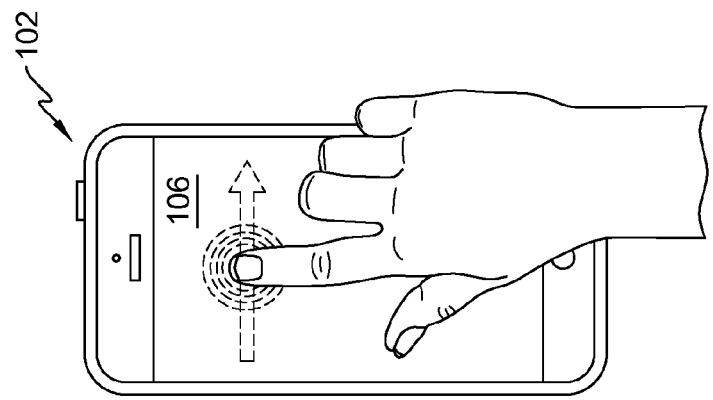
FIGS. 6A-6D illustrate an exemplary implementation of the physical notification application, according to an embodiment of the present disclosure.
Figure 6C:
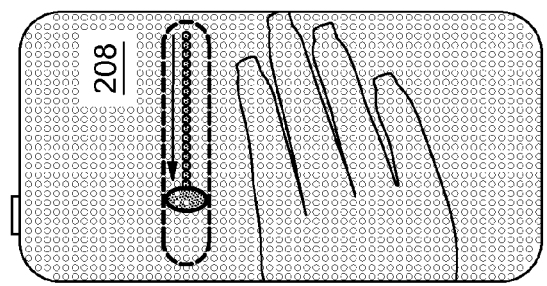
Figure 6B:
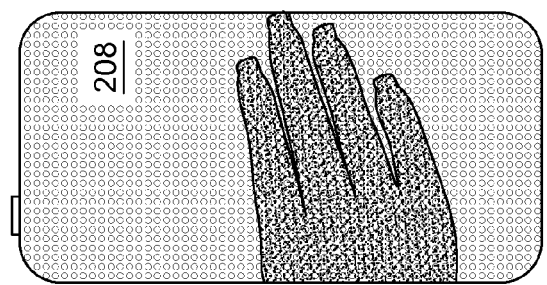
Figure 6A:
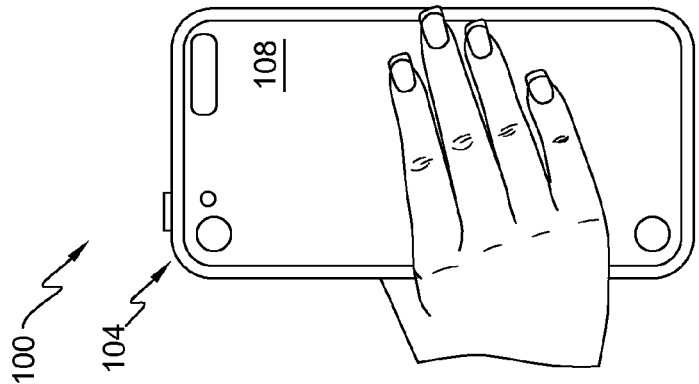

At 502 the operating system (OS) of the mobile device 100 may be running the described physical notification application. It should be noted that the physical notification application may be turned on by default in the device OS. Then, at 506, the physical notification application may detect a relative position of the user's fingers on the back area 104 of the mobile device 100 through the contact sensing layer 108 (FIG. 6A). It should be noted that no action is performed by the OS of the mobile device 100 when the physical notification application is turned off (step 504).

Information regarding the relative position of the user's finger(s) may be sent, at 508, to the chip 204 (FIG. 2) where advanced features in a particular software running on the mobile device 100 may be detected or identified by the physical notification application (step 510). At 512 the appropriate tactile and/or thermal feedback is chosen according to the detected position of the fingers in the contact sensing layer 108 (FIG. 6A) or the desired notification method desired by a particular application. The appropriate feedback (e.g. vibration flow and/or temperature change) may be generated in the interactive layer 202 (FIG. 2) as illustrated in FIGS. 6B-6C according to the relative position of the user's finger(s) in the contact sensing layer 108 (FIG. 6A) at 516. Once the user feels the vibration flow and/or temperature change, he/she may be directed to access the mobile device 100 at 518 via the touchscreen interface 106 (FIG. 6D).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method comprising:
   detecting, by a contact sensing layer, a position of one or more fingers of a mobile device user, wherein the contact sensing layer is located in a back area of a mobile device and the one or more fingers of the mobile device user are in direct contact with the contact sensing layer;
   receiving the detected position of the one or more fingers;
   identifying at least one software application running on the mobile device;
   associating a feedback type with the at least one software application running on the mobile device;
   associating the feedback type with the position of the one or more fingers in the area of the contact sensing layer;
   receiving an instruction from the at least one software application running in the mobile device; and
   in response to the received instruction from the at least one software application, generating the feedback type in an interactive layer of the mobile device located in direct contact with an entire surface of the contact sensing layer, wherein the feedback type is generated solely in an area corresponding with the detected position of the one or more fingers, wherein the generated feedback type is detectable by the one or more fingers,
   wherein the generated feedback type alerts and causes a response from the mobile device user.

2. The method of claim 1, wherein the feedback type comprises a directional vibration flow.

3. The method of claim 1, wherein the interactive layer comprises a plurality of balls configured to generate a motion wave that travels in different directions according to the detected position of the one or more fingers by the contact sensing layer.

4. The method of claim 3, wherein the motion wave comprises a plurality of sequential taps hopping between different points selected based on the detected position of the one or more fingers to present the feedback type associated with the at least one software application to the mobile device user.

5. The method of claim 3, wherein the motion wave comprises vertical, horizontal, or angled movements.

6. The method of claim 1, wherein the feedback type comprises a local change in a temperature of the contact sensing layer.

7. The method of claim 1, wherein the interactive layer comprises a plurality of heating nodes to generate a temperature wave that travels in different directions according to the detected position of the one or more fingers by the contact sensing layer.

8. The method of claim 1, further comprising:
   identifying a first software application and a second software application running on the mobile device; and
   associating a first feedback type with the first software application and a second feedback type with the second software application, wherein the first feedback type is different from the second feedback type.

9. A method comprising:
   determining a position of one or more fingers of a user in direct contact with a contact sensing layer, the contact sensing layer comprises an outer back layer of a mobile device above and in direct contact with an interactive layer, the interactive layer comprises an inner layer of the mobile device adjacent to a chip of the mobile device and is able to communicate with the chip and the contact sensing layer;
   identifying one or more software applications running on the mobile device;
   associating a feedback type with each software application in the one or more software applications running on the mobile device, wherein the feedback type comprises a directional temperature change accompanied by a vibrational movement;
   associating the feedback type with the determined position of the one or more fingers;
   receiving an instruction from at least one software application in the one or more software applications running in the mobile device, the instruction requesting an action by the user; and
   in response to the received instruction, generating the feedback type associated with the at least one software application solely in an area corresponding with the determined position of the one or more fingers to alert the user of the received instruction and cause the requested action from the user, wherein the generated feedback type comprises:
   generating, by the interactive layer, the directional temperature change accompanied by the vibrational movement based on the determined position of the one or more fingers and each software application, and delivering, via the contact sensing layer, the feedback type to the user.

10. The method of claim 9, wherein the interactive layer comprises:

a plurality of balls configured to generate a motion wave; and a plurality of heating nodes configured to generate a temperature wave, wherein the motion wave and the temperature wave in association with each software application and the determined position of the one or more fingers creates the directional temperature change accompanied by the vibrational movement in the contact sensing layer.

* * * * *